United States Patent Office 3,009,177
Patented Nov. 21, 1961

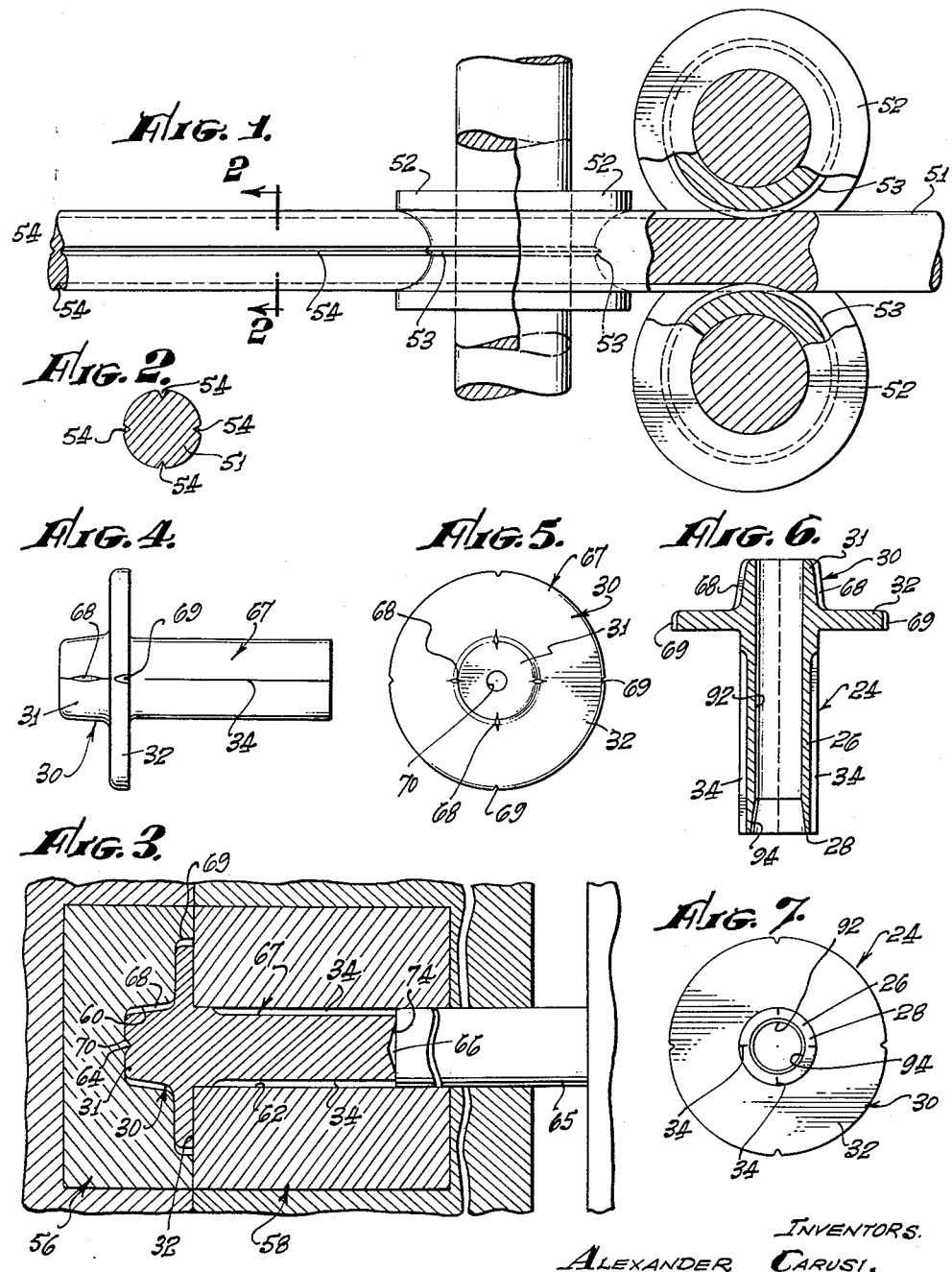

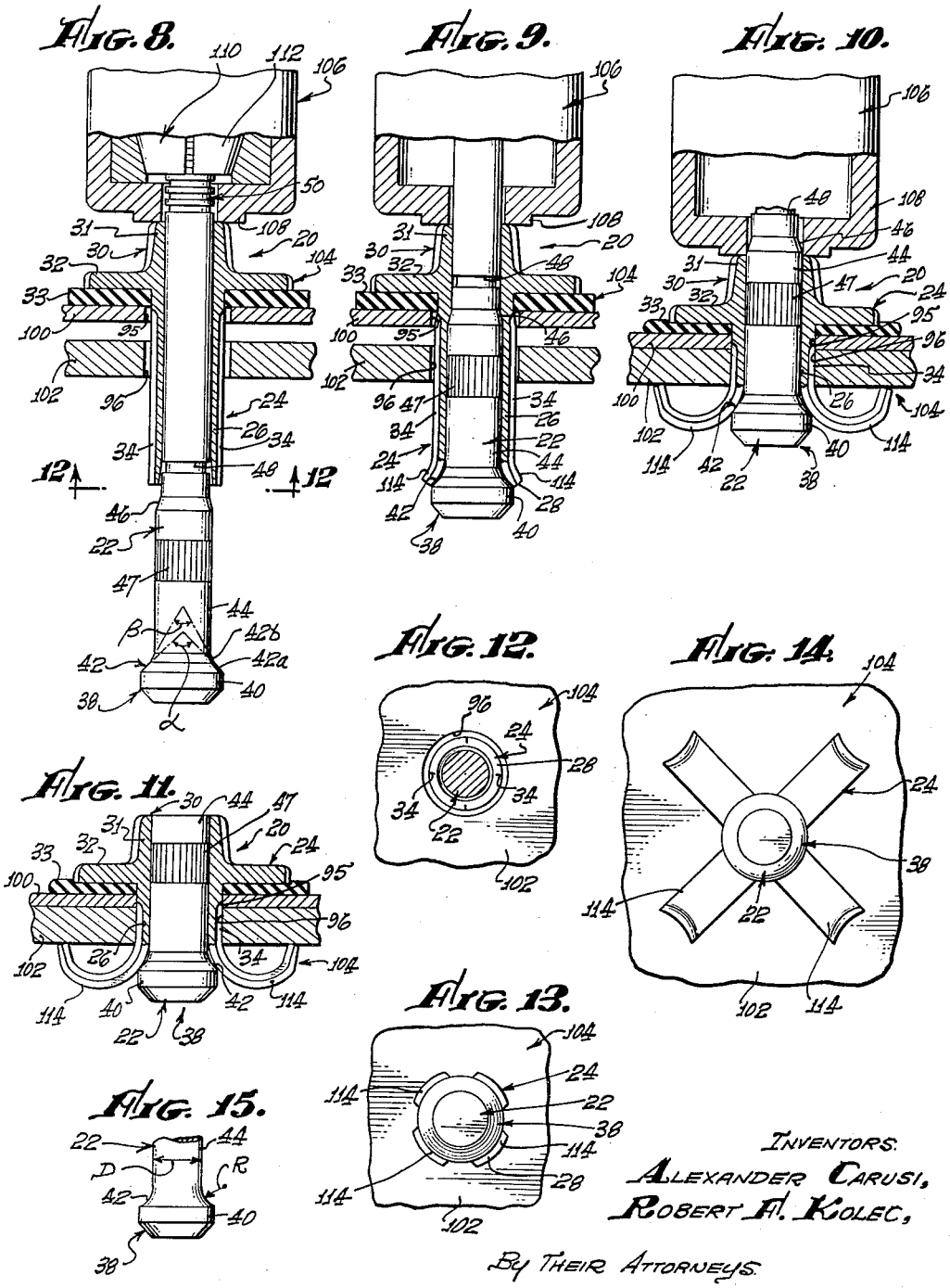

3,009,177
METHOD OF FORGING BLIND RIVET HAVING A HOLLOW SHANK WITH LONGITUDINAL LINES OF WEAKNESS
Alexander Carusi, Downey, and Robert F. Kolec, Whittier, Calif., assignors to Olympic Screw & Rivet Corporation, Downey, Calif., a corporation of California
Filed Oct. 31, 1957, Ser. No. 693,749
3 Claims. (Cl. 10—27)

The present invention relates in general to a blind rivet assembly and to a method of manufacturing a component of such an assembly, a primary object of the invention being to provide a blind rivet assembly capable of producing high clinching forces when set.

As general background, a blind rivet assembly of the type to which the present invention relates comprises a stem having thereon a tubular rivet which includes a sleeve having a head at one end and a tail at its other end, the stem being provided at one end thereof with tail flaring means adjacent and engageable with the tail of the tubular rivet and being provided with grippable means at the other end thereof. Preferably, the stem is provided with an enlarged shank adjacent the tail flaring means and is provided with a weakened zone intermediate such shank and the grippable means.

In setting a rivet assembly of the foregoing type, the assembly is inserted through registering holes in elements to be riveted together so that the tail of the tubular rivet and the tail flaring means on the stem are on the blind or inaccessible side of such elements and the head of the tubular rivet and the grippable means are on the opposite side thereof. A riveting tool having pressure and pulling members is applied to the rivet assembly with the pressure member seated against the head of the tubular rivet and with the pulling member in engagement with the grippable means on the stem. The pulling member is then moved axially of the pressure member to draw the enlarged shank of the stem into the sleeve of the tubular rivet so as to expand the sleeve into engagement with the elements to be riveted together, and to draw the tail flaring means on the stem into tail flaring engagement with the tail of the tubular rivet, thereby clamping the elements which are to be riveted together between the head of the tubular rivet and the flared tail thereof. Eventually, the stem of the rivet assembly is broken off at the weakened zone therein and any excess portion of the stem may be trimmed off flush with the head of the tubular rivet.

An important object of the present invention is to provide a rivet assembly of the foregoing nature wherein the external surface of the sleeve of the tubular rivet is provided with longitudinal lines of weakness from the tail of such sleeve toward the head thereof so that, as the tail flaring means on the stem is drawn into the sleeve, the sleeve is split longitudinally into a plurality of prongs which engage one side of the assembly of elements to be riveted together, the head on the tubular rivet engaging the opposite side thereof.

Another important object of the invention is to provide a method of forming a tubular rivet of the foregoing nature from a solid bar of material which comprises grooving the bar longitudinally and then upsetting one end of the bar to form the head of the rivet and at the same time reducing the diameter of the bar slightly between the other end or tail thereof and the head so as to close the longitudinal grooves in the bar between the tail and the head so as to form the longitudinal lines of weakness mentioned, the foregoing operations being performed by cold working of the bar. An axial bore is then drilled through the bar to form the sleeve of the tubular rivet.

When the diameter of the bar is reduced slightly by cold working to close the longitudinal grooves therein in the foregoing manner to produce the longitudinal lines of weakness mentioned, the walls of the grooves are not welded together so that the sleeve is capable of splitting from the tail of the rivet along such longitudinal lines of weakness toward the head thereof, even though the longitudinal grooves forming the longitudinal lines of weakness may be closed to such an extent as to render them invisible, or substantially invisible.

Still another important object of the invention is to provide a rivet assembly incorporating means for causing the prongs resulting from splitting of the sleeve along the longitudinal lines of weakness to curl outwardly through substantially 180° as the tail flaring means is drawn into the sleeve. This outward curling of the prongs produces high clinching forces, which is an important feature.

One object of the invention in the foregoing connection is to provide a tubular rivet which is so formed during the manufacture thereof that the prongs resulting from splitting of the sleeve inherently tend to curl outwardly as the sleeve is split.

An important object in the same connection is to provide the tail flaring means on the stem with a divergent annular surface of concave cross section which engages the internal surface of the sleeve to force the prongs outwardly and which is so shaped as to curl the prongs outwardly through substantially 180°, such divergent annular surface being arcuate in cross section in one embodiment and having a radius of curvature within a predetermined range, and, in another embodiment, including two straight sections each including an angle within a predetermined range.

The foregoing objects, advantages, features and results of the present invention, together with various other objects, advantages, features and results thereof which will be evident to those skilled in this art in the light of the present disclosure, may be attained with the exemplary embodiments of the invention which are illustrated in the accompanying drawings and which are described in detail hereinafter. Referring to the drawings:

FIG. 1 is a view, partially in elevation and partially in longitudinal section, illustrating means for grooving a solid bar or rod longitudinally thereof as an initial step in the method of the invention;

FIG. 2 is a transverse sectional view of a longitudinally grooved bar formed with the means of FIG. 1 and is taken along the arrowed line 2—2 of FIG. 1;

FIG. 3 is a longitudinal sectional view of a die means for forming the longitudinally grooved bar produced by the means of FIG. 1 into a rivet blank;

FIG. 4 is a side elevational view of a completed rivet blank formed by the die means of FIG. 3;

FIG. 5 is an end elevational view of the rivet blank and is taken from the left end of FIG. 4;

FIG. 6 is a longitudinal sectional view of a completed tubular rivet of the invention;

FIG. 7 is an end elevational view of the completed tubular rivet and is taken from the lower end of FIG. 6;

FIGS. 8, 9, 10 and 11 are longitudinal sectional views illustrating successive steps in the setting of a blind rivet assembly of the invention;

FIG. 12 is a transverse sectional view taken along the arrowed line 12—12 of FIG. 8;

FIG. 13 is an end elevational view of the lower end of the rivet assembly as it is shown in FIG. 9;

FIG. 14 is an elevational view of the lower end of the rivet assembly as it is shown in FIG. 11 of the drawings; and FIG. 15 is an elevational view of another stem embodiment of the invention.

Referring first to FIG. 8 of the drawings, the completed blind rivet assembly of the invention is designated generally by the numeral 20 and includes a stem 22 having thereon a tubular rivet 24. The latter includes a sleeve 26 having a tail 28 and a head 30 at opposite ends thereof, the head being shown as including a central boss 31 and an annular flange 32. A sealing washer 33 is shown as carried by the sleeve 26 in engagement with the under side of the head 30 for installations in which a fluid-tight seal is required. The external surface of the sleeve 26 is provided with longitudinal lines of weakness 34 therein which extend from the tail toward the head 30. These lines of weakness preferably terminate short of the head 30 and, as will be discussed in detail hereinafter, have the form of longitudinal cracks or fissures produced by closing longitudinal grooves in a bar or rod from which the rivet 24 is made without welding the walls of such grooves together. The depth of the fissures 34 should not exceed approximately one-half the thickness of the sleeve 26. For example, for a sleeve thickness of 0.40 inch, the fissure depth should be approximately 0.15 to 0.20 inch.

The stem 22 is provided at one end thereof with an enlarged shank 44 terminating in a tail flaring means 38 adjacent and engageable with the tail 28 of the sleeve 26, the tail flaring means 38 comprising an enlargement or head 40 on the stem having divergent annular surface 42 for tail flaring engagement with the internal surface of the sleeve 26, as will be described. The annular surface 42 in this embodiment is formed by two tapered sections 42a and 42b of the stem, the section 42a being relatively obtuse and the section 42b being relatively acute so that the annular surface 42 approaches an arcuate, concave surface in cross section. To provide the curling action hereinbefore mentioned and hereinafter discussed in more detail, it is essential that the included angle $\alpha$, of the tapered section 42a be 90° within a range of plus 4° and minus 0°, and that the included angle, $\beta$, of the tapered section 42b be 60°, within a range of plus 0° and minus 4°.

The tail flaring means 38 merges with the enlarged shank 44, which tapers into the body of the stem 22, as indicated at 46, the shank having a knurled or longitudinally serrated portion 47 for engagement with the internal surface of the sleeve 26 of the tubular rivet 24. Adjacent the enlarged shank 44 is a weakened zone 48 of the stem 22, this weakened zone preferably being formed by providing the stem with an annular groove therein. The stem 22 is provided, at the end thereof opposite the tail flaring means 38, with grippable means 50, the means 50 being engageable by a gripping means on the pulling member of a riveting tool to be described. While a particular form of grippable means 50 has been illustrated, it will be understood that other types of grippable means may be substituted therefor.

Considering now the method of the invention of manufacturing the tubular rivet 24 of the invention, the starting material is preferably cylindrical bar stock 51, as shown in FIG. 1 of the drawings. The bar stock 51 may be of any suitable material, aluminum being an example.

As shown in FIG. 1 of the drawings, the bar stock 51 is passed through a longitudinal grooving means which includes two pairs of concave rollers 52 provided with central, annular, grooving beads or ribs 53 of V-shaped cross section. The rollers 52 of each pair are circumferentially spaced 180° apart, while the two pairs of rollers are spaced apart by 90°. Consequently, as the bar stock 51 is passed through the two pairs of rollers 52, the grooving ribs 53 form four longitudinal grooves 54 in the bar stock. The grooves 54 are spaced apart circumferentially by 90° and are formed by lateral displacement of the surface material of the bar stock by the grooving ribs 53.

Referring now to FIG. 3 of the drawings, a piece of the grooved bar stock 51 of appropriate length is placed between two relatively movable dies 56 and 58. The die 56 is provided therein with a head-forming cavity 60 and the die 58 is provided with a cavity 62 for forming the exterior of the sleeve 26 of the tubular rivet 24, the cavity 62 being referred to as a sleeve-forming cavity for convenience. The die 56 is provided with a center punch 64 which projects into the head-forming cavity 60 in a direction axially of the sleeve-forming cavity 62. Extending into the sleeve-forming cavity 62 is a ram 65 having a center punch 66 thereon which also projects axially into the sleeve-forming cavity.

As will be apparent, when a length of the grooved bar stock 51 is forced into the dies 56 and 58 by the ram 65, it is formed into a rivet blank 67 conforming in external configuration to the combined internal configurations of the cavities 60 and 62. The diameter of the sleeve-forming cavity 62 is slightly less than the original diameter of the length of grooved bar stock 51 so that the grooves 54 of the sleeve 26 of the rivet blank 67 are closed by cold working without, however, welding the walls of the grooves together. This provides the external surface of the sleeve 26 of the rivet blank 67 with the hereinbefore-discussed lines of weakness or fissures 34, these extending from the tail 28 of the rivet blank 67 substantially to the head 30 thereof.

Since one end of the length of grooved bar stock 51 which is placed in the dies 56 and 58 to form the rivet blank 67 is upset to a substantial extent to form the head 30 of the rivet blank, portions of the walls of the grooves 54 may actually be welded together in this region. Ordinarily, however, grooves or fissures 68 will remain in the boss 31 of the head 30 and notches 69 will remain in the periphery of the annular flange 12 of the head. The walls of the longitudinal grooves 54 in the sleeve 26 of the rivet blank 67 may be welded together completely in the immediate vicinity of the head 30, due to the greater deformation of the material of the length of grooved bar stock 51 in this area. However, throughout most of the length of the sleeve 26 of the rivet blank 67, the grooves 54 remain as the desired lines of weakness or fissures 34.

It will be understood that although the rivet blank 67 has been shown as formed in a single cold heading operation, it may be formed in a series of two or more such operations if desired.

As will be apparent, the center punches 64 and 66 respectively form axial recesses 70 and 74 in the head 30 and the tail 28 of the rivet blank 67. The effect of the action of the center punches 64 and 66 is to compact the material of the rivet blank 67 axially in a central zone of the blank, the possible result of this increase in the density of the central zone being discussed hereinafter.

Referring to FIGS. 6 and 7 of the drawings, an axial bore 92 is drilled through the rivet blank 67, utilizing either the recess 70 or the recess 74, and preferably the latter, as a drill guide. The tail end of the bore 92 is provided with a countersink 94 which diverges toward the tail 28 of the rivet and which facilitates insertion of the shank 44 of the stem 22 of the rivet assembly 20 into the sleeve 26 of the tubular rivet 24. Also, the countersink 94 thins the sleeve 26 at the tail 28 of the rivet 24 to facilitate initiation of splitting of the sleeve along the lines of weakness 34. Once the axial bore 92 and the countersink 94 have been formed, the tubular rivet 24 is completed and may be assembled with the stem 22 to form the complete rivet assembly 20.

Referring now to FIG 8 of the drawings, the blind rivet assembly 20 is inserted into registering holes 95 and 96 through elements 100 and 102 which are to be riveted together to form an assembly 104, FIGS. 11 and 14. When the rivet assembly 20 is thus inserted into the holes 95 and 96, the tail 28 of the tubular rivet 24 and the tail flaring means 38 and the enlarged shank 44 on the stem 22 are disposed on one side of the assembly 104, while the head 30 of the tubular rivet and the grippable means 50 on the stem are disposed on the opposite side of the assembly. The washer 33, if used, under the head 30 is engageable with one side of the assembly 104.

With the rivet assembly 20 inserted through the assembly 104 in the foregoing manner, a suitable riveting tool 106 is applied to the rivet assembly 20. More particularly, the riveting tool 106 is provided with a pressure member 108 adapted to seat on the head 30, and is provided with a pulling member 110 which is movable axially of the pressure member and which is provided with gripping means 112 for gripping the grippable means 50 on the stem 22 of the rivet assembly. The foregoing conditions obtaining, the pulling member 110 is moved axially of the pressure member 108 in a direction away from the assembly 104 to pull the stem 22 into the sleeve 26 of the tubular rivet 24.

Referring to FIG. 9, as the stem 22 is moved axially of the tubular rivet 24 to pull it into the sleeve 26, the enlarged shank 44 on the stem first expands the sleeve 26 to at least substantially fill the holes 95 and 96 through the assembly 104. As the tapered section 42b of the tail flaring means 38 engages the tail 28 of the tubular rivet 24, the sleeve 26 of this rivet splits along the longitudinal fissures 34 in the external surface thereof to form prongs 114. After the tapered section 42b of the tail flaring means 38 forms the prongs 114, the tapered section 42a thereof spreads and curls them outwardly through substantially 180°, as illustrated in FIGS. 9 and 10. This outward curling of the prongs 114 is due primarily to the action of the concave surface 42 of the tail flaring enlargement 40, but, as will be explained hereinafter, may also be due in part to the previously described compaction of the central zone of the rivet blank 67 in the process of forming it, it being essential to obtain proper curling, however, that the included angle $\beta$ of the tapered section 42b, which performs primarily a splitting function, be $\alpha$ between 56° and 60°, and that the included angle of the tapered section 42a, which performs primarily a curling function, be between 90° and 94°. Ultimately, the tail flaring means 38 spreads and curls the prongs 114 so that the outer ends thereof seat against one side of the assembly 104, as shown in FIG. 11, further axial movement of the stem 22 resulting in pressing the outer ends of the prongs 114 solidly against one side of the assembly 104 to provide a very high clamping or clinching force between the prongs and the head 30, which is an important feature of the invention.

Eventually, the resistance to axial movement of the stem 22 relative to the tubular rivet 24 reaches a value such that it exceeds the tensile strength of the weakened zone 48 of the stem 22, whereupon the stem ruptures at such weakened zone as illustrated in FIG. 10 of the drawings.

After rupture of the stem 22 in the foregoing manner, the stem may be trimmed off flush with the head 30 of the tubular rivet 24, as shown in FIG. 11 of the drawings, to provide a finished appearance.

Referring to FIG. 15 of the drawings, instead of using the two tapered sections 42a and 42b, the same splitting and curling effects may be achieved by actually making the annular surface 42 arcuate. In this case, the radius of curvature, R, of the surface 42 must be between 50% and 80% of the diameter, D, of the shank 44 of the stem 22.

Considering now the previously mentioned theory which may be partially explanatory of the outward curling of the prongs 114, the outward curling thereof is, as previously suggested, due primarily to the curling action provided by the concave or substantially concave tail flaring surface 42. However, the outward curling of these prongs may be due also to the hereinbefore described manner in which the tubular rivet 24 of the invention is formed. It is believed that the outward curling of the prongs 114 results to some extent from the compacting of the central zone of the blank 67 by means of the center punches 64 and 66 in the process of forming the grooved bar 51 into the rivet blank 67. Apparently what occurs during the formation of the grooved bar 51 into the tubular rivet 24 in the hereinbeforedescribed manner is that the material of the sleeve 26 is compacted more adjacent the internal surface of the sleeve than adjacent the external surface thereof, the density of the material forming the sleeve thus increasing radially from the external surface of the sleeve toward the internal surface thereof, despite the fact that the most compacted central zone has been drilled out in forming the axial bore 92. Consequently, the material adjacent the internal surface of the sleeve 26 is in a state of axial compression relative to the material adjacent the external surface of the sleeve, or, in other words, the material adjacent the external surface of the sleeve is in a state of axial tension relative to the material adjacent the internal surface of the sleeve. Consequently, when the sleeve 26 is split into the prongs 114 along the longitudinal fissures 34, the stress differential between the interior and the exterior of the sleeve 26 is relieved, the inner surfaces of the prongs 114 expanding axially and the outer surfaces thereof contracting axially to possibly help cause the hereinbeforedescribed outward curling of the prongs. It has not been possible thus far to devise any means for measuring the actual residual stresses in the material of the sleeve 26 adjacent the internal and external surfaces thereof to determine whether the foregoing is correct, but it is believed that it is.

Although exemplary embodiments of the invention have been disclosed herein for purposes of illustration, it will be understood that various changes, modifications, and substitutions may be incorporated in such embodiments without departing from the spirit of the invention as defined by the following claims.

We claim:

1. A method of forming from a solid bar of material having circumferentially spaced, longitudinal grooves therein a tubular rivet which includes a sleeve having a head at one end, including the steps of upsetting one end of said bar to form said head, and simultaneously with said upsetting step confining and axially supporting the remainder of said bar and thereby at the same time closing said grooves between the other end of said bar and said head to bring the side walls of each of said grooves into contact without welding them together so as to form a fissure having its side walls in contact, and forming an axial hole through said bar of such a size as to leave a wall having a thickness greater than the depth of said fissures but sufficiently thin to be readily splittable along said fissures upon the application of radial forces thereto.

2. In a method of forming from a solid bar of material a tubular rivet which includes a sleeve having a head at one end, the steps of: forming circumferentially spaced, longitudinal grooves in said bar; and subsequently upsetting one end of said bar to form said head, and simultaneously with said upsetting step confining and axially supporting the remainder of said bar and thereby at the same time closing said grooves between the other end of said bar and said head to bring the side walls of each of said grooves into contact without welding same together so as to form a fissure having its side walls in contact, and forming an axial hole through said bar of such a size as to leave a wall having a thickness greater than the depth of said fissures but sufficiently thin to be readily splittable along said fissures upon the application of radial forces thereto.

3. In a method forming from a solid bar of material a tubular rivet which includes a sleeve having a head at one end, the steps of: forming circumferentially spaced, longitudinal grooves in said bar; and subsequently upsetting one end of said bar to form said head, and simultaneously with said upsetting step confining and axially supporting the remainder of said bar and thereby at the same time closing said grooves between the other end of said bar and said head to bring the side walls of each of said grooves into contact without welding same together so as to form a fissure having its side walls in contact while compacting a central zone of said bar axially thereof, and forming an axial hole through said bar of such a size as to leave a wall having a thickness greater than the depth of said fissures but sufficiently thin to be readily splittable along said fissures upon the application of radial forces thereto.

References Cited in the file of this patent
UNITED STATES PATENTS

| | | |
|---|---|---|
| 918,193 | Patterson | Apr. 13, 1909 |
| 1,201,945 | Dodds | Oct. 17, 1916 |
| 1,889,324 | Tryon | Nov. 29, 1932 |
| 2,361,770 | Huck | Oct. 31, 1944 |
| 2,586,336 | Huck | Feb. 19, 1952 |
| 2,635,501 | Eichner | Apr. 21, 1953 |
| 2,652,741 | Ketchum | Sept. 22, 1953 |
| 2,887,694 | Sauter | May 26, 1959 |